United States Patent
Golombowski et al.

(10) Patent No.: US 11,499,075 B2
(45) Date of Patent: Nov. 15, 2022

(54) ISOCYANATE FUNCTIONAL ADHESIVE WHICH BONDS PRIMERLESS TO SILANATED ACRYLIC POLYOL BASED COATINGS

(71) Applicant: DDP SPECIALTY ELECTRONIC MATERIALS US, LLC, Wilmington, DE (US)

(72) Inventors: Dietmar Golombowski, Horgen (CH); Andreas Lutz, Freienbach (CH); Stefan Schmatloch, Freienbach (CH); Huide D. Zhu, Auburn Hills, MI (US)

(73) Assignee: DDP SPECIALTY ELECTRONICS MATERIALS US, LLC, Wilmington, DE (US)

( * ) Notice: Subject to any disclaimer, the term of this patent is extended or adjusted under 35 U.S.C. 154(b) by 435 days.

(21) Appl. No.: 16/636,430

(22) PCT Filed: Oct. 1, 2018

(86) PCT No.: PCT/US2018/053740
§ 371 (c)(1),
(2) Date: Feb. 4, 2020

(87) PCT Pub. No.: WO2019/068083
PCT Pub. Date: Apr. 4, 2019

(65) Prior Publication Data
US 2020/0339847 A1 Oct. 29, 2020

Related U.S. Application Data

(60) Provisional application No. 62/565,514, filed on Sep. 29, 2017.

(51) Int. Cl.
| | | |
|---|---|---|
| C08G 18/10 | (2006.01) | |
| C09J 175/08 | (2006.01) | |
| C08G 18/48 | (2006.01) | |
| C08G 18/76 | (2006.01) | |
| C08K 13/02 | (2006.01) | |

(52) U.S. Cl.
CPC ............ *C09J 175/08* (2013.01); *C08G 18/10* (2013.01); *C08G 18/4812* (2013.01); *C08G 18/7671* (2013.01); *C08K 13/02* (2013.01); *C08K 2201/006* (2013.01)

(58) Field of Classification Search
CPC . C08G 18/10; C08G 18/4812; C08G 18/7671
USPC ...................... 524/314; 528/25, 28
See application file for complete search history.

(56) References Cited

U.S. PATENT DOCUMENTS

| | | |
|---|---|---|
| 4,345,053 A | 8/1982 | Rizk et al. |
| 4,374,237 A | 2/1983 | Berger et al. |
| 4,625,012 A | 11/1986 | Rizk et al. |
| 4,687,533 A | 8/1987 | Rizk et al. |
| 4,758,648 A | 7/1988 | Rizk et al. |
| 4,780,520 A | 10/1988 | Rizk et al. |
| 5,063,269 A | 11/1991 | Hung |
| 5,603,798 A | 2/1997 | Bhat |
| 5,623,044 A | 4/1997 | Chiao |
| 5,852,137 A | 12/1998 | Hsieh et al. |
| 5,922,809 A | 7/1999 | Bhat et al. |
| 5,976,305 A | 11/1999 | Bhat et al. |
| 6,015,475 A | 1/2000 | Hsieh et al. |
| 6,512,033 B1 | 1/2003 | Wu |
| 7,416,599 B2 | 8/2008 | Hsieh et al. |
| 8,524,840 B2 | 9/2013 | Zhu et al. |
| 8,569,438 B2 | 10/2013 | Groenewolt et al. |
| 8,679,589 B2 | 3/2014 | Groenewolt et al. |
| 9,045,672 B2 | 6/2015 | Jialanella et al. |
| 9,353,287 B2 | 5/2016 | Groenewolt et al. |
| 2002/0100550 A1 | 8/2002 | Mahdi et al. |
| 2008/0220173 A1 | 9/2008 | Poppe et al. |
| 2010/0015344 A1 | 1/2010 | Groenewolt et al. |
| 2015/0225617 A1* | 8/2015 | Schwoeppe ................ C09J 5/02 502/155 |

FOREIGN PATENT DOCUMENTS

WO 199502621 1/1995

* cited by examiner

*Primary Examiner* — Terressa Boykin

(57) ABSTRACT

Disclosed is a composition including one or more isocyanate functional prepolymers; one or more catalysts for the reaction of isocyanate moieties and active hydrogen containing moieties; one or more mercapto silanes; one or more amino silanes, isocyanato silanes or a mixture thereof; one or more reinforcing fillers comprising one or more high surface area carbon blacks; one or more untreated calcium carbonates; one or more polyisocyanates having an isocyanate functionality of about 2 or greater; and one or more linear plasticizers. Preferably, the isocyanate functional prepolymer is prepared in the presence of at least a portion of the linear plasticizer. Preferably, the isocyanate functional polymer is prepared in the presence of a dialkyl malonate. The composition may be one-part adhesive composition. Also disclosed are methods of applying the compositions to substrates. The composition bonds primerlessly to hard to bond to coatings, such as coatings prepared from compositions including a silanated component, such as a silanated acrylopolyols, or having silica clusters.

11 Claims, No Drawings

ISOCYANATE FUNCTIONAL ADHESIVE WHICH BONDS PRIMERLESS TO SILANATED ACRYLIC POLYOL BASED COATINGS

CLAIM OF PRIORITY

The present application claims the benefit of priority of U.S. Provisional Patent Application 62/565,514 filed on Sep. 29, 2017, the contents of which are incorporated by reference in its entirety.

FIELD

The invention relates to an isocyanate functional adhesive which bonds primerless to hard to bond to coatings, such as silanated acrylic polyol-based coatings. The invention also comprises a method of using such systems for bonding substrates together.

BACKGROUND

Compositions having isocyanate functional components are utilized to bond substrates together, such as, glass, often in the form of windows, into structures. In automotive assembly plants windows are often bonded in with one-part adhesive compositions containing isocyanate functional components, which cure by reaction with ambient moisture, and take several hours or days to cure. In the assembly plants, vehicles are not driven for several hours and this is acceptable. One-part moisture curing adhesives known in the art are disclosed in U.S. Pat. Nos. 4,374,237; 4,687,533; 4,780,520; 5,063,269; 5,623,044; 5,603,798; 5,852,137; 5,922,809; 5,976,305; 5,852,137 and 6,512,033, relevant portions incorporated herein by reference.

Traditionally when isocyanate functional adhesives were used to bond windows into vehicles primers were applied to both the window and the window flange of the vehicle which has a coating deposited on the flange. The use of primers renders the process more time consuming, costly and prone to errors which can result in poor bonding of the adhesive to the substrates. A number of adhesives have been developed that are capable of bonding to coatings on a window flange without the need for a primer, see for example U.S. Pat. No. 8,524,840 incorporated herein by reference in its entirety for all purposes. Coatings producers continue to develop new and improved coatings adapted to stand up to environmental conditions. These coatings can be difficult for isocyanate functional component based adhesives to bond thereto. An example of such a coatings system is a coating includes one or more silanated components. For example, the silanated component may be in an isocyanate containing component or in a hydroxyl containing component. Coatings having a silanated component include silanated acrylic polyol based coatings. Difficult to bond to coatings may be formed of components where one or more of the components includes one or more hydroyzable silane groups. Difficult to bond to coatings may include inorganic silica clusters that provide a hard, scratch resistant surface. The silica clusters may form a network and/or be surrounded by an organic material that is sufficiently flexible to prevent cracking when the substrate is bent or upon impact. Coatings having improved scratch resistance and weathering stability are described for example in U.S. Pat. Nos. 8,569,438, 8,679,589, 9,353,287, US 2010/0015344, and US 2008/0220173, each incorporated herein by reference in their entirety.

There is a need for isocyanate component functional adhesive systems that can bond to hard to bond to coatings, such as silanated acrylic polyols. There is a need for methods of bonding substrates together wherein at least one of the substrates is a hard to bond to coating.

SUMMARY

Disclosed is a composition comprising: a) one or more isocyanate functional prepolymers containing a linear plasticizer and a dialkyl malonate; b) one or more catalysts for the reaction of isocyanate moieties and active hydrogen containing moieties; c) one or more mercapto silanes; d) one or more amino silanes, isocyanato silanes or a mixture thereof; e) one or more reinforcing fillers comprising one or more carbon blacks; f) one or more untreated calcium carbonates; and g) one or more polyisocyanates having an isocyanate functionality of about 2 or greater. The composition may be a one-part adhesive composition. The mercapto silane may be present in an amount of about 0.3 to about 1.5 percent by weight or about 0.6 to about 1.1 percent by weight based on the weight of the composition. The one or more amino silanes, isocyanato silanes or a mixture thereof may be present in an amount of about 0.4 to 2.0 percent by weight or in an amount of about 0.4 to 1.3 percent by weight based on the weight of the composition. The composition may comprise one or more amino silanes. The amino silane may have one secondary amine. The amino silane may be a bis(di or tri alkoxy silyl alkyl) amine. The reinforcing filler may be one or more high surface area carbon blacks. The reinforcing filler may have an oil absorbtion number of about 80 to about 120 g/100 ml. The dialkyl malonate may be present in an amount of about 0.05 to about 1 percent by weight of the composition. The plasticizer may be a linear phthalate. The one or more polyisocyanates having an isocyanate functionality of about 2.0 or greater may comprise a trimer of an aliphatic polyisocyanate, a polymeric MDI or a mixture thereof. The one or more polyisocyanates having an isocyanate functionality of about 2.0 or greater may have a functionality of greater than 2. The one or more polyisocyanates having an isocyanate functionality of about 2.0 or greater may comprise a trimer of an aliphatic polyisocyanate. The composition may comprise: a) from about 30 to about 65 percent by weight of the one or more isocyanate functional prepolymers containing a linear plasticizer and a dialkyl malonate; b) from about 0.03 to 1.6 percent by weight of the one or more catalysts for the reaction of isocyanate moieties and active hydrogen containing moieties; e) from about 15 to about 30 percent by weight of the one or more reinforcing fillers comprising one or more high surface area carbon blacks; f) from about 8 to about 20 percent by weight of the one or more untreated calcium carbonates; and, g) from greater than 0 to about 3 percent by weight of the one or more polyisocyanates having an isocyanate functionality of about 2.0 or greater; wherein all percentages are based on the weight of the composition. The amount of the polymeric MDI may be about 2.0 percent by weight or less, based on the weight of the composition. The amount of the polymeric MDI may be about 0.99 percent by weight or less, based on the weight of the composition. The linear plasticizer may be present in an amount of about 0 to about 40 percent by weight based on the weight of the composition. The isocyanate functional prepolymer preferably is formed in the presence of the linear plasticizer, the dialkyl malonate, or both.

Disclosed is a method comprising: a) contacting a composition according to as disclosed herein; b) contacting a first substrate with a second substrate with the composition disposed between the substrates and c) allowing the composition to cure. The first substrate may be a hard to bond to coating. For example, the first substrate may be formed from a coating composition include one or more silanated components, and/or may include silica clusters. The first substrate may be a surface of a vehicle. For example, the first substrate may be a structure having a window opening. The second substrate may be glass, a polymer, or a metal. The second substrate may be a surface of a molding, an ornamentation, a mirror housing, or a window. Preferably, the second substrate is a window. The second substrate may be a vehicle window and the first substrate is the flange of a vehicle coated with a coating including a silanated component, such as a silane based acrylic polyol coating.

The compositions and methods disclosed allow bonding of structures together wherein at least one of the substrates is coated with a difficult to bond to coating, for instance a silanated acrylic polyol. The composition bonds to a cured coating containing a silane based acrylic polyol in the absence of a primer or pretreatment applied to the coating. In quick knife adhesion testing the composition when bonded to a cured coating, including those containing a silane based acrylic polyol exhibits 100 percent cohesive failure.

DETAILED DESCRIPTION

One or more as used herein means that exactly one, at least one, or more than one, of the recited components may be used as disclosed. Durability in this context means that the composition once cured remains sufficiently strong to perform its designed function, in the embodiment wherein the cured composition is an adhesive, the adhesive holds substrates together for the life or most of the life of the structure containing the cured composition. As an indicator of this durability, the curable composition (e.g. adhesive) preferably exhibits excellent results during accelerated aging. Preferably this means that after a set of substrates bonded with the composition of the invention is exposed to heat aging, the failure mode in Quick Knife adhesion or Lap Shear testing is cohesive, meaning the adhesive breaks before the bond of the adhesive to the substrate breaks. Isocyanate content means the weight percent of isocyanate groups in the designated component, which can be measured by analytical techniques known to one skilled in the art, for example by potentiometric titration with an active hydrogen containing compound, such as dibutyl amine. Hydrocarbyl refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. The term isocyanate-reactive compound as used herein includes any organic compound having nominally at least two isocyanate-reactive groups. For the purposes of this invention, isocyanate-reactive groups, active hydrogen containing groups, refer to a group containing a hydrogen atom which, because of its position in the molecule, displays significant activity according to the Zerewitinoff test described by Wohler in the *Journal of the American Chemical Society*, Vol. 49, p. 3181 (1927). Illustrative of isocyanate-reactive groups are —COOH, —OH, —NH$_2$, —NH—, —CONH$_2$, —SH, and —CONH—. Exemplary compounds containing isocyanate-reactive groups include polyols, polyamines, polymercaptans and polyacids.

Disclosed is a composition that comprises comprising: a) one or more isocyanate functional prepolymers containing a linear plasticizer and a dialkyl malonate; b) one or more catalysts for the reaction of isocyanate moieties and active hydrogen containing moieties; c) one or more mercapto silanes; d) one or more amino silanes, isocyanato silanes or a mixture thereof; e) one or more reinforcing fillers comprising one or more carbon blacks; f) one or more untreated calcium carbonates; and g) one or more polyisocyanates having an isocyanate functionality of about 2 or greater. The composition bonds well to hard to bond to coatings and can be used to bond substrates coated with such coatings to other substrates, such as glass.

Isocyanate based (polyurethane or polyurea forming) curable systems comprise an isocyanate functional component. An isocyanate functional component contains one or more compounds having on average more than one isocyanate group per molecule. The isocyanate functional components can be any component which contains on average more than one isocyanate group (moiety). The isocyanate functional component can be in the form of an isocyanate functional prepolymer, a monomer or oligomer or an adduct of one or more monomer or oligomers having isocyanate groups and a compound containing on average greater than 1 isocyanate reactive groups, or 2 or more isocyanate groups. The isocyanate functional prepolymer can be any prepolymer prepared by reaction of an isocyanate functional compound with one or more compounds having on average more than one isocyanate reactive functional groups.

The one or more isocyanate functional components, such as prepolymers, are present in sufficient quantity to provide cohesive strength, and in adhesive uses, adhesive character to the composition. Such isocyanate functional components, such as prepolymers, have an average isocyanate functionality sufficient to allow the preparation of a crosslinked polyurethane upon cure and not so high that the polymers are unstable. Prepolymers useful as isocyanate functional components are prepared by reacting one or more polyisocyanates with one or more compounds containing on average more than one isocyanate reactive groups per molecule. The isocyanate functional components, prepolymers, may have a free isocyanate content which facilitates acceptable strength in the compositions prepared therefrom, as described hereinbefore. The free isocyanate content in the isocyanate functional components may be about 0.4 percent by weight or greater based on the weight of the isocyanate functional components, about 0.7 percent by weight or greater, about 1.0 percent or greater, or about 1.2 percent by weight or greater. The free isocyanate content in the isocyanate functional components may be about 15 percent by weight or less based on the weight of the isocyanate functional components, about 10 percent by weight or less, about 5.0 percent by weight or less, about 3.0 percent by weight or less or about 2.0 percent by weight or less. The free isocyanate content may be calculated from the weight of the N=C=O groups (molecular weight of approximately 42 g/mole) in the isocyanate functional component and the weight of the component.

The polyisocyanates for use in preparing the isocyanate functional components may include any aliphatic, cycloaliphatic, araliphatic, heterocyclic or aromatic polyisocyanate, or mixtures thereof. The polyisocyanates used may have an average isocyanate functionality of about 1.8 or greater and an equivalent weight of about 80 or greater. The isocyanate functionality of the polyisocyanate may be about 2.0 or greater, about 2.2 or greater or about 2.4 or greater. The isocyanate functionality of the polyisocyanate may be about 4.0 or less, about 3.5 or less, or about 3.0 or less. Higher functionality may also be used, but may cause excessive cross-linking, and result in a composition which is too viscous to handle and apply easily, and can cause the cured composition to be too brittle. The equivalent weight of the polyisocyanate may be about 110 or greater or about 120 or greater. The equivalent weight of the polyisocyanate may be about 300 or less, about 250 or less, or about 200 or less. Examples of polyisocyanates include those disclosed by Wu, U.S. Pat. No. 6,512,033 at column 3, line 3 to line 49, incorporated herein by reference. The isocyanates may be aromatic isocyanates, alicyclic isocyanates and derivatives thereof. The aromatic isocyanates have the isocyanate groups bonded directly to aromatic rings. Exemplary polyisocyanates include di phenyl methane diisocyanate and polymeric derivatives thereof, isophorone diisocyanate, tetramethylxylene diisocyanate, 1,6-hexamethylene diisocyanate and polymeric derivatives thereof, bis(4-isocyanato cylohexyl)methane, and trimethyl hexamethylene diisocyanate. The isocyanate may be diphenylmethane diisocyanate. The amount of isocyanate containing compound used to prepare the prepolymer is that amount that gives the desired properties, that is, the appropriate free isocyanate content and viscosities as discussed herein. The ratio of the number of equivalents of the isocyanate groups (NCO) to the number of equivalents of the isocyanate reactive groups used to prepare the isocyanate functional prepolymer may be about 1.03 or more, about 1.1 or more, about 1.3 or more, about 1.4 or more, or about 1.5 or more. The ratio of the number of equivalents of the isocyanate groups (NCO) to the number of equivalents of the isocyanate reactive groups used to prepare the isocyanate functional prepolymer may be about 3.0 or less, about 2.5 or less, or about 2.0 or less.

The isocyanate functional components may be the reaction product of one or more polyisocyanates with one or more compounds having more than one, or two or more, isocyanate reactive groups, wherein an excess of isocyanate groups are present on an equivalents basis. Such isocyanate reactive groups may be hydroxyl groups and amino groups. An exemplary class of such compounds includes polyols, such as a mixture of one or more polyether diols and/or one or more polyether triols. Exemplary polyols useful in the preparation of the prepolymers include those disclosed in Wu, U.S. Pat. No. 6,512,033 at column 4, line 10 to line 64, incorporated herein by reference, and include, for example, polyether polyols, polyester polyols, poly(alkylene carbonate)polyols, hydroxyl containing polythioethers and mixtures thereof. The polyols may be polyether polyols containing one or more alkylene oxide units in the backbone of the polyol. Exemplary alkylene oxide units are ethylene oxide, propylene oxide, butylene oxide and mixtures thereof. The alkylene oxides can contain straight or branched chain alkylene units. The polyol may contain propylene oxide units, ethylene oxide units or a mixture thereof. Where a mixture of alkylene oxide units is contained in a polyol, the different units can be randomly arranged or can be arranged in blocks of each of the alkylene oxides. The polyol may comprise propylene oxide chains with ethylene oxide chains capping the polyol. The ethylene oxide capped polypropylene oxides may be hydrophobic, and contain less than about 20 mole percent of ethylene oxide or less than 10 mole percent of ethylene oxide in the backbone. The isocyanate-reactive compound may have a functionality of about 1.8 or greater, about 1.9 or greater, or about 1.95 or greater. The isocyanate-reactive compound may have a functionality of about 4.0 or less, about 3.5 or less, or about 3.0 or less. The equivalent weight of the isocyanate-reactive compound may be about 200 or greater, about 500 or greater, or about 1,000 or greater. The equivalent weight of the isocyanate-reactive compound may be about 5,000 or less, about 3,000 or less, or about 2,500 or less. The isocyanate reactive components are present in an amount sufficient to react with most of the isocyanate groups of the isocyanates leaving enough isocyanate groups to correspond with the desired free isocyanate content of the prepolymer. The isocyanate reactive components may be present in an amount of about 25 percent by weight or greater, based on the weight of the prepolymer, about 50 percent by weight or greater, about 65 percent by weight or greater or about 80 percent by weight or greater. The isocyanate components may be present in an amount of about 95 percent by weight or less based on the weight of the prepolymer or about 90 parts by weight or less. The total weight of the polyisocyanate and the polyols in the isocyanate functional prepolymer preferably is about 20 percent by weight or more, about 30 percent by weight or more, or about 35 percent by weight or more, based on the total weight of the prepolymer. The total weight of the polyisocyanate and the polyols in the isocyanate functional prepolymer preferably is about 85 percent by weight or less, about 80 percent by weight or less, or about 75 percent by weight or less, based on the total weight of the prepolymer. The isocyanate functional prepolymer may have an average molecular weight of about 400 g/mole or more, about 500 g/mole or more, about 700 g/mole or more, or about 900 g/mole or more. The isocyanate functional prepolymer may have an average molecular weight of about 5000 g/mole or less, about 3000 g/mole or less, or about 2000 g/mole or less. It will be appreciated that isocyanate functional prepolymers having an average molecular weight greater than about 5000 g/mole or more may also be employed.

The isocyanate functional component may comprise one or more prepolymers containing one or more organic based polymer particles dispersed therein or grafted to the backbone. The organic based polymer particles may be included in the prepolymer by inclusion of a dispersion triol having dispersed therein or grafted to the backbone organic based polymer particles. Exemplary polyols which contain one or more organic based polymer particles are disclosed in Zhou, U.S. Pat. No. 6,709,539 at column 4, line 13 to column 6, line 18, incorporated herein by reference. The polyols may comprise one or more polyether triols or one or more polyoxyalkylene based triols. Such polyoxyalkylene oxide triols may comprise polyoxypropylene chains with polyoxyethylene end caps. The particles may comprise one or more of thermoplastic polymers, rubber-modified thermoplastic polymers or a polyurea. Such polyols may be contained in the composition in an amount of about 0.5 percent by weight or greater. Such polyols are contained in the adhesive in an amount of about 5 percent by weight or less.

The composition may further comprise one or more isocyanate functional prepolymers containing one or more polyester based polyols which are solid at ambient temperature, about 23° C. The polyester based polyols have melting points such that the prepolymer provides sufficient green strength to prevent the substrates from moving in relation to one another due to gravitational forces at ambient temperatures. In terms of installing a window in a vehicle or building, the polyester based prepolymer prevents the window from sliding after installation. The polyester polyols may have melting points of about 40° C. or greater, about 45° C. or greater or about 50° C. or greater. The polyester polyols may exhibit melting points of about 85° C. or less, about 70° C. or less or about 60° C. or less. The polyester based isocyanate functional prepolymer can be prepared using one or more polyester polyols and a polyisocyanate, for example an aromatic polyisocyanate. In order to facilitate pumpability, it may be diluted with a plasticizer. The polyester polyol based isocyanate prepolymer is present in the composition in sufficient amount to enhance the needed green strength, rheology and pumpability of the composition. If the amount is too high, the composition is not hand gun applicable at ambient temperature. The polyester polyol based isocyanate prepolymer may be present in the composition in an amount of about 0 percent by weight or greater based on the weight of the composition, about 1 percent by weight or greater or about 2 percent by weight or greater. The polyester polyol based isocyanate prepolymer may be present in the composition in an amount of about 10 percent by weight or less, about 5 percent by weight or less or about 3 percent by weight or less.

The isocyanate functional components may be prepared by any suitable method, such as bulk polymerization and solution polymerization. The reaction to prepare the isocyanate functional components is carried out under anhydrous conditions, for example under an inert atmosphere such as a nitrogen blanket and to prevent crosslinking of the isocyanate groups by atmospheric moisture. The reaction may be carried out at a temperature of between about 0° C. and about 150° C., or between about 25° C. and about 90° C., until the residual isocyanate content determined by titration of a sample is very close to the desired theoretical value. The reactions to prepare the isocyanate functional components may be carried out in the presence of catalysts for the reaction of isocyanate moieties with isocyanate reactive moieties, for example stannous salts of carboxylic acids, such as stannous octoate, stannous oleate, stannous acetate, and stannous laurate; dialkyltin dicarboxylates, such as dibutyltin dilaurate and dibutyltin diacetate; tertiary amines and tin mercaptides. The amount of catalyst employed is generally from about 0.005 to about 5 parts by weight of the mixture catalyzed. The reaction may be carried out in admixture with a plasticizer.

The isocyanate functional components are present in the composition in a sufficient amount such that the cured composition has sufficient strength for its designed purpose, such that the adhesive is capable of bonding substrates together and to provide the desired cohesive and adhesive strengths. The isocyanate functional components, including any linear plasticizer and any dialkyl malonate, may be present in an amount of about 30 percent by weight or greater based on the weight of the composition, about 40 percent by weight or greater, about 45 percent by weight or greater or about 55 percent by weight or greater, based on the total weight of the composition. The isocyanate functional components, including any linear plastic and any dialkyl malonate may be present in an amount of about 70 percent by weight or less based on the weight of the composition, about 65 percent by weight or less, about 62 percent by weight or less or about 55 percent by weight or less. The portion of the isocyanate functional components having one or more isocyanate functional groups (e.g., excluding any compounds that have not reacted with the isocyanate in the prepolymer, such as unreacted linear plasticizer and unreacted dialkyl malonate) may be about 15 percent by weight or more, about 22 percent by weight or more, about 26 percent by weight or more, about 30 percent by weight or more, or about 35 percent by weight or more, based on the total weight of the composition. The portion of the isocyanate functional components having one or more isocyanate functional groups (e.g., excluding any compounds that have not reacted with the isocyanate in the prepolymer, such as unreacted linear plasticizer and unreacted dialkyl malonate) may be about 65 percent by weight or less, about 60 percent by weight or more, about 55 percent by weight or less, about 50 percent by weight or less, or about 45 percent by weight or more, based on the total weight of the composition. The isocyanate functional component preferably comprises one or more plasticizers, and more preferably one or more linear plasticizers. The linear plasticizer may be any linear plasticizer that enhances bonding of the composition formed to hard to bond to coatings. Linear plasticizer means that the backbone of the plasticizer molecules (e.g., aliphatic chains) in the composition are linear and not branched. Exemplary linear plasticizers include linear phthalates. The linear plasticizer may have an average molecular weight of about 190 g/mole or more, or about 300 g/mole or more. The linear plasticizer may have an average molecular weight of about 700 g/mole or less, about 600 g/mole or less, or about 500 g/mole or less. The plasticizer may include one or more phthalates such as one or more of the following phthalates: dimethyl phthalate, diethyl phthalate, diallyl phthalate, di-n-propyl phthalate, di-n-butyl phthalate, diisobutyl phthalate, butyl cyclohexyl phthalate, di-n-pentyl phthalate, dicyclohexyl phthalate, di-n-pentyl phthalate, dicyclohexyl phthalate, butyl benzyl phthalate, di-n-hexyl phthalate, diisohexyl phthalate, diisoheptyl phthalate, butyl decyl phthalate, di(2-ethylhexyl) phthalate, di(n-octyl) phthalate, diisooctyl phthalate, n-octyl n-decyl phthalate, diisononyl phthalate, di(2-propylheptyl) phthalate, diisodecyl phthalate, diundecyl phthalate, diisoundecyl phthalate, ditridecyl phthalate, and diisotridecyl phthalate. The linear plasticizer is preferably a phthalate plasticizer based on linear alcohols. The linear alcohol preferably is an even numbered alcohol. A preferred linear plasticizer is a di-$C_{10}$-$C_{12}$ alkyl phthalate. The linear plasticizer may be present in a sufficient amount to enhance bonding of the composition formed to hard to bond to coatings. The linear plasticizer may be present in an amount of greater than 0 percent by weight of the composition, about 6 weight percent or greater, about 10 percent by weight or greater or about 15 percent by weight or greater. The linear plasticizer may be present in an amount of about 45 percent by weight or less of the composition, about 40 percent by weight or less, about 30 percent by weight or less or about 25 percent by weight or less. The isocyanate functional prepolymer preferably is prepared in the presence of the linear plasticizer. The linear plasticizer may react with one or more compounds used in the isocyanate functional prepolymer and be incorporated into the isocyanate functional prepolymer. The isocyanate functional prepolymer may include residual, unreacted linear plasticizer, or may be substantially or entirely free of residual, unreacted linear plasticizer. Alternatively, the linear plasticizer may be included so that it is generally unreacted in the composition. The linear plasticizer may be present in an amount of about 10 percent by weight or greater of the isocyanate functional prepolymer, about 17 percent by weight or greater or about 22 percent by weight or greater. The linear plasticizer may be present in an amount of about 60 percent by weight or less of the isocyanate functional prepolymer, about 50 percent by weight or less, about 45 percent by weight or less or about 40 percent by weight or less.

The isocyanate functional component, such as the isocyanate functional prepolymer, may further comprise an isocyanate stabilizer which functions to prevent curing of the isocyanate functional component prior to application, that is while it in its packaging. Any isocyanate stabilizer may be used. The isocyanate stabilizer may be a dialkyl malonate, for instance dimethyl or diethyl malonate, and the like. The isocyanate stabilizer may be present in an amount which stabilizes the isocyanate groups prior to application and which does not interfere with curing once applied to a substrate. The isocyanate functional prepolymer is preferably prepared in the presence of the isocyanate stabilizer. The isocyanate stabilizer may be present in an amount of about 0.05 percent by weight or greater based on the weight of the composition or based on the weight of the isocyanate functional prepolymer, about 0.1 percent by weight or greater or about 0.65 percent by weight or greater. The isocyanate stabilizer may be present in an amount of about 5 percent by weight or less based on the weight of the composition or based on the weight of the isocyanate functional prepolymer, about 2 percent by weight or less, about 1.5 percent by weight or less or about 1 percent by weight or less. It will be appreciated that an isocyanate stabilizer may be added to the prepolymer and the same or a different isocyanate stabilizer may be further added to the composition.

The one-part compositions useful as adhesives may further comprise one or more polyfunctional isocyanates, isocyanates having a functionality of about 2 or greater or greater than 2, for the purpose of improving adhesion of the composition to substrate surfaces. "Polyfunctional" as used in the context of the isocyanates refers to isocyanates having a functionality of 2 or greater. The polyisocyanates can be any monomeric, oligomeric or polymeric isocyanates having a nominal functionality of about 2.2 or greater, 2.5 or greater or about 3.0 or greater. The polyfunctional isocyanates may have a nominal functionality of about 5 or less, about 3.5 or less or about 3.2 or less. The polyfunctional isocyanates can be any isocyanates which are reactive with the isocyanate polyisocyanate prepolymers and/or isocyanate reactive components used in the composition and which improve the modulus of the cured composition. The polyisocyanates can be monomeric; or biurets of monomeric isocyanates; oligomeric or polymeric, the reaction product of several units of one or more monomeric isocyanates. Examples of polyfunctional isocyanates include trimers of hexamethylene diisocyanate, such as those available from Bayer under the trademark and designation DESMODUR N-3300, DESMODUR N-100, and polymeric isocyanates such as polymeric MDI (methylene diphenyl diisocyanates) such as those marketed by The Dow Chemical Company under the trademark of PAPI, including PAPI 20 and PAPI 27 polymeric isocyanates. The polyfunctional isocyanates may be present in mixtures of more than one. Exemplary mixtures include mixtures of trimeric isocyanurates, such as those based on hexamethylene diisocyanate, and polymeric isocyanates based on aromatic isocyanates, such as MDI. The polyfunctional isocyanates are present in a sufficient amount to impact the modulus of the cured compositions of the invention. If too much is used, the cure rate of the composition is unacceptably slowed down. If too little is used, the desired modulus levels may not be achieved. The polyfunctional isocyanate may be present in an amount of about 0.5 percent by weight or greater based on the weight of the composition, about 1.0 percent by weight or greater or about 1.4 percent by weight or greater. The polyfunctional isocyanate is may be present in an amount of about 4 percent by weight or less, based on the weight of the composition, about 3 percent by weight or less or about 2 percent by weight or less. Where the polyfunctional isocyanates comprise more than one polyfunctional isocyanate and one is a polymeric isocyanate based on aromatic isocyanates, such as MDI, the amount of polymeric isocyanate may be less than 1.0 percent by weight. The polyisocyanate may be free of isocyanate reactive compounds. Monomeric isocyanates and biurets of monomeric isocyanates typically have a molecular weight of about 580 g/mole or less, about 380 g/mole or less, or about 280 g/mole or less.

The compositions may also contain one or more catalysts which catalyzes the reaction of isocyanate moieties with an isocyanate reactive compound, an active hydrogen containing compound. The catalysts can be any catalysts known to the skilled artisan for the reaction of isocyanate moieties with isocyanate reactive compounds, including tertiary amines, metal catalysts, for example organotin compounds and metal alkanoates. A mixture of a tertiary amine and a metal catalyst, such as an organotin compound may be used. Exemplary organotin compounds include alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. Dialkyl tin dicarboxylates with lower total carbon atoms may be used as they are more active catalysts. Exemplary dialkyl tin dicarboxylates include 1,1-dimethyltin dilaurate, 1,1-dibutyltin diacetate and 1,1-dimethyltin dimaleate. Exemplary metal alkanoates include bismuth octoate or bismuth neodecanoate. The metal catalyst may be present in an amount of about 60 parts per million or greater based on the weight of the composition, or about 120 parts by million or greater. The metal catalyst may be present in an amount of about 1.0 percent or less based on the weight of the composition, about 0.5 percent by weight or less or about 0.3 percent by weight or less.

The tertiary amine catalysts may comprise one or more compounds having one of more tertiary amine groups capable of accelerating the reaction of isocyanate moieties with isocyanate reactive groups, active hydrogen containing groups. Exemplary tertiary amine catalysts include dimorpholinodialkyl ether, a di((dialkylmorpholino)alkyl)ether, bis-(2-dimethyl aminoethyl) ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine and mixtures thereof. An exemplary dimorpholinodialkyl ether is dimorpholino diethyl ether. An exemplary di((dialkylmor-pholino) alkyl)ether is (di-(2-(3,5-dimethyl morpholino)ethyl)-ether). One class of tertiary amines comprise diazabicyclo compounds which are compounds which have diazobicyclo structures. Exemplary diazabicyclo hydrocarbons include diazabicycloalkanes and diazabicyclo alkene salts. In some embodiments, it is preferable that the catalyst comprises one or more diazabicyclo-alkanes and one or more diazabicyclo alkene salts. Exemplary diazabicycloalkanes include diazabi-cyclooctane, available from Air Products under the trademark and designations, DABCO, DABCO WT, DABCO DC 1, DABCO DC 2, and DABCO DC 21. Exemplary diazabicycloalkene salts include diazabicycloundecene in the phenolate, ethylhexoate, oleate and formiate salt forms, available from Air Products under the trademark and designations, POLYCAT SA 1, POLYCAT SA 1/10, POLYCAT SA 102 and POLYCAT SA 610. The one or more compounds containing one or more tertiary amines may be present in an amount of about 0.05 percent by weight or greater based on the weight of the composition, about 0.1 percent by weight or greater or about 0.15 percent by weight or greater. The one or more compounds containing one or more tertiary amine groups may be present in an amount of about 5.0 percent by weight or less based on the weight of the composition, about 2.0 percent by weight or less or about 1.0 percent by weight or less.

The composition may further comprise an adhesion promoter or adhesion promoting component, such as those disclosed in Mandi, U.S. Patent Publication 2002/0100550 paragraphs 0055 to 0065 and Hsieh, U.S. Pat. No. 6,015,475 column 5, line 27 to column 6, line 41 incorporated herein by reference. The adhesion promoter may contain a silane present in some form, such as disclosed in Wu et al., U.S. Pat. No. 6,512,033 at column 5, line 38 to column 7, line 27; U.S. Pat. Nos. 5,623,044; 4,374,237; 4,345,053 and 4,625,012, relevant portions incorporated herein by reference. The silane may be blended with the other components of the composition or with the isocyanate functional component (e.g, the isocyanate functional prepolymer). The silane may have one or more active hydrogen atoms which are reactive with an isocyanate. The silanes having, active hydrogen atoms reactive with isocyanate moieties, can be reacted with the terminal isocyanate moieties of the prepolymer. Such reaction products are disclosed in U.S. Pat. Nos. 4,374,237 and 4,345,053 relevant parts incorporated herein by reference. The silanes having reactive hydrogen moieties reactive with isocyanate moieties can be reacted into the backbone of the prepolymer by reacting such silane with the starting materials during the preparation of the prepolymer. The process for the preparation of prepolymers containing silane in the backbone is disclosed in U.S. Pat. No. 4,625,012, relevant portions incorporated herein by reference. Such silane, having active hydrogen moieties, can be reacted with a polyisocyanate to form an adduct which is blended with the prepolymer reacted with a polyurethane prepolymer or reacted with a polyisocyanate and a compound having on average more than one moiety reactive with an isocyanate moiety. The adduct may be a reaction product of a secondary amino- or mercapto-alkoxy silane and a polyisocyanate, the adduct having an average of at least one silane group and at least one isocyanate group per molecule (hereinafter "adduct"). Exemplary polyisocyanates for use in preparing the adduct include those described above as suitable for use in preparing the prepolymer, including isophorone diisocyanate, polymethylene polyphenyl-isocyanates, and aliphatic polyisocyanate such as hexamethylene diisocyanate. Exemplary organofunctional silanes useful as adhesion promoters or to prepare adducts include amino- or mercapto-alkoxy silanes, isocyanato alkoxy silanes, methacryloxy silanes, epoxy alkoxy silanes, alkenyl alkoxy silanes and the like. Examples of such compounds include: N,N-bis[(3-triethoxysilyl) propyl]amine; N,N-bis [(3-tripropoxy-silyl) propyl] amine; N-(3-trimethoxysilyl) propyl-3-[N-(3-trimethoxysilyl)-propyl amino] propionamide; N-(3-triethoxysilyl) propyl-3-[N-3-triethoxysilyl)-propyl-amino]propion amide; N-(3-trimethoxysilyl)propyl-3-[N-3-triethoxysilyl)-propylamino]propionamide; 3-trimeth-oxysilyl-propyl 3-[N-(3-trimethoxysilyl)-propylamino]-2-methyl propionate; 3-triethoxysilyl propyl 3-[N-(3-triethoxysilyl)-propylamino]-2-methyl propionate; 3-trimethoxysilylpropyl 3-[N-(3-triethoxy-silyl)-propylamino]-2-methyl propionate; and the like. The amount of adhesion promoter present is that amount which enhances the adhesion of the adhesive to the substrate surface. The amount of adhesion promoter present may be about 0.1 percent by weight or greater based on the weight of the adhesive, about 0.3 percent by weight or greater, or about 0.4 percent by weight or greater. The amount of adhesion promoter may be about 3.0 percent by weight or less, about 2.0 percent by weight or less, or about 1.2 percent by weight or less.

Preferably, the adhesion promoters used in the composition includes a plurality of silanes having different functional groups. More preferably, the adhesion promoter includes one or more mercapto silane and one or more silanes having a functional group different from the mercapto group. For example, the different functional group may be an amine group or an isocyanate group. The adhesion promoters may include a mixture of one or more mercapto silanes and i) one or more amino silanes and/or ii) one or more isocyanato silanes. More preferably, the mixture includes at least one mercapto silane and at least one amino silane. The amino silanes may have one or more secondary amines. The amino silane may include or more alkoxy groups. The aminosilane may be a bis(di or tri alkoxy silyl alkyl) amine. The alkoxy group preferably are each independently ethoxy or methoxy groups. The alkyl group preferably is a lower alkyl, having about 1 to about 8 carbon atoms, having about 2 to about 4 carbon atoms, or propyl. Where such a mixture is used the amount of the mercapto silane may be about 0.3 percent by weight of the composition or greater, about 0.4 percent by weight or greater or about 0.6 percent by weight or greater. Where such a mixture is used the amount of the mercapto silane may be about 2.0 percent by weight of the composition or less, about 1.5 percent by weight or less or about 1.1 percent by weight or less. Where such a mixture is used the amount of the one or more amino silanes, isocyanato silanes or a mixture thereof may be about 0.1 percent by weight of the composition or greater, about 0.3 percent by weight or greater or about 0.4 percent by weight or greater. Where such a mixture is used the amount of the one or more amino silanes, isocyanato silanes or a mixture thereof may be about 2.0 percent by weight of the composition or less, about 1.3 percent by weight or less or about 0.9 percent by weight or less. The total amount of the mecapto silanes, the amino silanes and the isocyanate silanes may be about 0.4 percent by weight or more of the composition, about 0.6 percent by weight or more, about 0.8 percent by weight or more, about 0.9 percent by weight or more, or about 1.0 percent by weight or more. The total amount of the mecapto silanes, the amino silanes and the isocyanate silanes may be about 5 percent by weight or less of the composition, about 4.0 percent by weight or less, about 2.5 percent by weight or less, about 2.1 percent by weight or less, or about 1.8 percent by weight or less. The total amount of the mecapto silanes, the amino silanes and the isocyanate silanes may be about 20 percent by weight or more of the silanes in the compositions, about 50 percent by weight or more, about 70 percent by weight or more, about 80 percent by weight or more, or about 90 percent by weight or more. The total amount of the mecapto silanes, the amino silanes and the isocyanate silanes may be about 100 percent by weight or less of the silanes in the composition.

The one-part composition may further include one or more one or more fillers. One class of fillers comprise reinforcing fillers, such as carbon black. The reinforcing fillers may comprise one or more high surface area carbon blacks. The reinforcing fillers may comprise a carbon black having an oil absorption number of about 80 to about 120 g/100 ml. The reinforcing filler may be present in an amount of about 15 percent by weight or greater of the composition or about 19 percent by weight or greater. The reinforcing filler may be present in an amount of about 25 percent by weight or less of the composition or about 23 percent by weight or less.

The composition may further comprise as a filler untreated calcium carbonate. Untreated means that no organic material is coated on the surface of the particles of the calcium carbonate. The calcium carbonate may be present in an amount of about 8 percent by weight or greater of the composition, about 10 percent by weight or greater, or about 12 percent by weight or greater. The calcium carbonate may be present in an amount of about 25 percent by weight or less of the composition or about 20 percent by weight or less, or about 18 percent by weight or less.

The one-part curable composition may contain one or more plasticizers to modify rheological properties to a desired consistency. Such materials should be free of water, inert to isocyanate groups and compatible with the prepolymer. Such material may be added to the reaction mixtures for preparing the isocyanate functional components, such as prepolymers, or to the mixture for preparing the final composition, but is preferably added to the reaction mixtures for preparing the isocyanate functional component, so that such mixtures may be more easily mixed and handled. Exemplary plasticizers are well known in the art and include straight and branched alkyl-phthalates, such as diisononyl phthalate, dioctyl phthalate and dibutyl phthalate, a partially hydrogenated terpene, trioctyl phosphate, epoxy plasticizers, toluene-sulfamide, chloro-paraffins, adipic acid esters, castor oil, xylene, 1-methyl-2-pyrrolidi-none and toluene. The amount of plasticizer used is that amount sufficient to give the desired rheological properties and disperse the components in the composition. The plasticizer may present in the compositions in an amount of about 0.5 part by weight or greater based on the weight of the compositions, about 1.0 percent by weight or greater or about 5.0 percent by weight or greater. The plasticizer may be present in an amount of about 35 percent by weight or less based on the weight of the compositions or about 30 percent by weight or less.

Other components commonly used in curable compositions may be used. Such materials are well known to those skilled in the art and may include ultraviolet stabilizers and antioxidants and the like. The one-part curable compositions may also contain durability stabilizers known in the art, such as alkyl substituted phenols, phosphites, sebacates and cinnamates, as disclosed in commonly owned patent application titled Dual Cure Adhesive Useful for Bonding to Glass, Jialanella U.S. patent application Ser. No. 13/455,294 filed Apr. 25, 2012, relevant parts incorporated herein by reference. The durability stabilizers may be present in the composition in an amount of about 0.1 percent by weight or greater or about 0.2 percent by weight or greater based on the weight of the composition. The durability stabilizers may be present in the composition in an amount of about 1.0 percent by weight or less or about 0.5 percent by weight or less based on the weight of the composition. The compositions may further include a light stabilizer which facilitates the system maintaining durable bond to the substrate for a significant portion of the life of the structure to which it is bonded may be used. Preferred light stabilizers are hindered amine light stabilizers. Exemplary hindered amine light stabilizers are disclosed in Hsieh et al. U.S. Pat. No. 7,416,599 column 11, line 31 to line 63, incorporated herein by reference. A sufficient amount is used to enhance the bond durability to the substrate. The light stabilizer may be used in amount of about 0.1 percent by weight or greater based on the weight of the composition, about 0.2 percent by weight or greater or about 0.3 percent by weight or. The light stabilizer may be present in an amount of about 3 weight percent or less based on the weight of the composition, about 2 weight percent or less or about 1 weight percent or less. The composition may further comprise an ultra-violet light which enhances the durability of the bond of the composition to a substrate. Exemplary UV light absorbers include benzophenones and benzotriazoles. Exemplary UV light absorbers include those disclosed in Hsieh et al. U.S. Pat. No. 7,416,599 column 11, line 64 to Column 12 line 29, incorporated herein by reference. The UV absorber may be used in an amount of about 0.1 percent by weight or greater based on the weight of the one-part curable composition, about 0.2 weight percent or greater or about 0.3 weight percent or greater. The UV light inhibitor may be used in amount of about 3 percent by weight or less based on the weight of the one-part curable composition, about 2 percent by weight or less or about 1 percent by weight or less.

The composition may be formulated by blending the components together using means well known in the art. The components are blended in a suitable mixer. Such blending may be conducted in under vacuum or in an inert atmosphere, such as nitrogen or argon, in the absence of oxygen and atmospheric moisture to prevent premature reaction. It may be advantageous to add plasticizers to the reaction mixture for preparing the isocyanate functional components so that such mixtures may be easily mixed and handled. Preferably, the plasticizer does not react with the isocyanate functional components and is thus present (e.g., in the prepolymer) as separate unreacted molecules. Alternatively, the plasticizers can be added during blending of all the components. The ingredients are blended for a sufficient time to prepare a well-blended mixture, such as from about 10 to about 60 minutes. Once the composition is formulated, it is packaged in a suitable container such that it is protected from atmospheric moisture. Contact with atmospheric moisture could result in premature crosslinking of the prepolymers containing isocyanate groups.

The compositions may be used to bond two substrates. The composition may be used to bond a first substrate having a hard to bond to coating to a same or different substrate, such as to a glass, a metal, or a plastic substrate. Bonding may be achieved without the use of a primer. As such, the composition may directly contact the first substrate, the second substrate, or both. The first substrate may be a coated component (preferably of a vehicle) and the second substrate may be a different component (such as a different automotive component). Examples of automotive components include a glass (e.g. a glass window), a plastic window, a molding, an ornamentation, or a mirror housing. The first substrate may be a window frame and the second substrate may be a glass or scratch resistant plastic window. The second substrate may be a window and the first substrate is a window frame of an automobile, which may be coated with a hard to bond to coating. Hard to bond coatings include those containing silanated compounds, such as silanated polyols and silanated isocyanates, and/or including inorganic silica clusters. For example, the coating may be a coating based on silanated acrylic polyols. Examples of such hard to bond coatings include, for instance those available from BASF under the trademarks and designations, of IGloss, PG40 and IGloss HAPS, such coatings can be clear coats that are scratch resistant and very easy to clean. The window may be cleaned and may have a glass wipe or primer applied to the area to which the adhesive is to be bonded. The window flange may be primed with a paint primer. The widow flange may not be primed or treated to enhance adhesion of the composition to the coated window flange. The composition is applied in a bead to the periphery of the window located such that it will contact the window flange when placed in the vehicle. The window with the composition located thereon is then placed into the flange with the composition located between the window and the flange. The bead of the composition is a continuous bead that functions to seal the junction between the window and the window flange. A continuous bead of the composition is a bead that is located such that the bead connects at each end to form a continuous seal between the window and the flange when contacted. Thereafter, the composition is allowed to cure. Compositions can be used to bond replacement windows into a structure. In this embodiment, the old window or a portion thereof is removed from the window flange or frame. This is typically achieved by cutting the old adhesive between the glass and the flange or frame. In some circumstances, the portion of the old adhesive remaining on the flange or window frame is left on the frame or flange. The portion of the flange or frame that does not have old adhesive deposited thereon can be primed. The composition can be applied to the frame or flange over the old adhesive and it will bond to the old adhesive. The old adhesive may be a polyurethane, siloxane, siloxy functional polyether or siloxy functional polyolefin. Application of the composition may be achieved with conventional, commercially available dispensers.

Curing can be accelerated by applying heat to the curing composition by means of infrared, induction, convection, or microwave heating, application of ultrasonic vibration and the like.

In another embodiment the compositions of the invention can be used to bond modular components to a car body or to each other. Examples of modular components include vehicle modules, such as door, window or body. Molecular weights as described herein are number average molecular weights which may be determined by Gel Permeation Chromatography (also referred to as GPC). For polyurethane prepolymers, it is also possible to calculate approximate number average molecular weight from the equivalent ratio of the isocyanate compounds and of the polyol compounds with which they are reacted as known to the persons skilled in the art.

ILLUSTRATIVE EMBODIMENTS OF THE INVENTION

The following examples are provided to illustrate the invention, but are not intended to limit the scope thereof. All parts and percentages are by weight unless otherwise indicated.

| RAW MATERIAL LIST | | |
|---|---|---|
| Prepolymers | Supplier | |
| Prepolymer 1 | DOW Automotive | MDI/PPO based Prepolymer, branched plasticizer |
| Prepolymer 2 | DOW Automotive | MDI/PPO based Prepolymer, linear plasticizer |
| Polyester Prepolymer Palsticizer | DOW Automotive | |
| VESTINOL ® 9 | Evonik | Diisononylphtalate; molecular weight: 418.6 g/mol |
| LINPLAST 810P | Sasol | Dialkyl phthalate (linear platicizer) |
| Carbon Black: | | |
| Elftex S7100 | Cabot | Carbon black; iodine absorption number: 85-95 g/kg; oil absorption number: 97-107 ml/100 g; sieve residue, 45 μm mocker: 0.01% max |
| Calcinated Kaolin: | | |
| POLESTAR ® 200R | Imerys | Calcinated Kaolin; surface area BET: 8.5 m2/g; pH: 6.5 ± 0.5 |
| Uncoated Kaolin | | |
| Carbital 140 | Imerys | Uncoated Kaolin; surface area BET: 2 m2/g; pH: 9.4; oil absorption: 17 g/100 g |
| Isocyanates | | |
| DESMODURE ® N3300 | Covestro | HDI-Trimerisat, hexamethylene diisocyanate trimere NCO content: 21.8 ± 0.3% Viscosity at 23° C.: 3.000 ± 750 mPa * s |
| ISONATE ® M600 | The Dow Chemical Company | Polymerik MDI (polymeric methylene diphenyl diisocyanate) Isocyanate Equiv.: 137-139 Isocyanate Content: 30.2-31.1 Viscosity at 25° C.: 520 to 680 mPa * s |
| VORANATE ® M600 | The Dow Chemical Company | High viscosity crude diphenylmethane diisocyanate having a vi9scosity of about 600 mPas at 25° C. |
| Glass Adhesion Promotor | | |
| SILQUEST ® A187 | Momentive Performance Materials Inc. | Gamma-glycidoxytrimethoxysilane |

RAW MATERIAL LIST

| Prepolymers | Supplier | |
|---|---|---|
| SILQUEST® A189 | Momentive Performance Materials Inc. | Gamma-mercaptopropyltrimethoxysilane |
| SILQUEST® A1170 | Momentive Performance Materials Inc. | bis-(trimethoxysilylpropyl)amine |
| SILQUEST® A-Link 35 | Momentive Performance Materials Inc. | 3-Isocyanatopropyltrimethoxy silane |
| SILQUEST® A-LINK 597 | Momentive Performance Materials Inc. | Tris-(3-(trimethoxysilyl)propyl)isocyanurate (MW 616) |
| Catalysts: | | |
| UL28 | The Dow Chemical Company | Dimethyl-tin-dilaureate/Vestinol |
| DMDEE | BASF | 2,2'-Dimorpholinodiethylether |
| Other | | |
| AEROSIL® 208 | EVONIK | Fumed silica aftertreated with polydimethylsiloxane |
| DYNASIL® A7161 | Dynasil Corporation | Fused silica |

Preparation of Isocyanate Functional Prepolymer 1

A polyether polyurethane prepolymer is prepared by mixing 22.571 g of a polyoxypropylene diol having an average molecular weight of 2000 g/mol commercially available under the trade mark VORANOL® 2000 L with 33.132 g of a polyoxypropylene triol having an average molecular weight of 4650 g/mol and commercially available under the trade mark Arcol CP 4655. 33.779 g of plasticizer agent (branched plasticizer) are added. 9.501 g Diphenylmethane 4,4'-diisocyanate are added. Afterwards, 0.001 g of orthophosphoric acid in 0.009 g MEK and 1 g of Diethylmalonate are added. Then, the entire mixture is heated to 50° C. in a reactor and 0.007 g of stannous octoate are added. The reaction is carried out for 1 hour at 50° C. The resultant prepolymer is referred to herein as NCO-prepolymer 1.

Preparation of Isocyanate Functional Prepolymer 2:

A polyether polyurethane prepolymer is prepared by mixing 22.571 g of a polyoxypropylene diol having an average molecular weight of 2000 g/mol commercially available under the trade mark Voranol 2000 L with 33.132 g of a polyoxypropylene triol having an weight of 4650 g/mol and commercially available under the trade mark Arcol CP 4655. 33.779 g of plasticizer agent LINPLAST 810P (linear plasticizer) are added. 9.501 g Diphenylmethane 4,4'-diisocyanate are added. Afterwards, 0.001 g of orthophosphoric acid in 0.009 g MEK and 1 g of Diethylmalonate were added. Then, the entire mixture was heated to 50° C. in a reactor and 0.007 g of stannous Octoate and were added. The reaction was carried out for 1 hour at 50° C. The resultant prepolymer is referred to herein as NCO-prepolymer 2.

Preparation of Isocyanate Functional Polyester Prepolymer T-721:

A polyether polyurethane prepolymer is prepared by mixing 46.7 g of plasticizer agent (branched plasticizer), 30.15 g of a isocyanate (Diphenylmethane 4,4'-diisocyanate (MDI)) commercially available under the trade name Isonate M125U with 190.0 g of a polyester polyol commercially available under the trade name DYNACOL 7381. Then, the entire mixture is stirred for 8 hours.

Synthesis of Catalyst Solution 2010:

Catalyst UL28 is added to Vestinol 9 plasticizer to prepare a good dispersion. After stirring the solution is filled into a flask under dry nitrogen to exclude moisture.

Adhesive Formulations

A planetary mixture is charged with the prepolymer as well as all liquid additives. The mixture is stirred for 35 minutes under vacuum at room temperature. Then carbon black, calcinated clay and fumed silica are added. The mixture is stirred five minutes under an atmosphere of nitrogen and subsequently 35 minutes under vacuum. For the polyester prepolymer containing formulation, the adhesive is stirred at 70° C. before adding the polyester prepolymer. Then stirring is continued for 30 minutes. Diisononylphtalate, the tin catalyst and the amine catalyst are added and the mixture is stirred 15 minutes under vacuum or until a homogeneous paste-like black mixture is observed.

Quick knife adhesion testing is performed on the cured adhesive formulations. The results are compiled in Table 1. QUICK KNIFE TEST: The samples are exposed on basis of defined exposure cycle. An adhesive bead with a defined geometry, typically 10 mm (height)×10-15 mm (width)×200 mm (length) is applied. The adhesive bead is compressed to a height of approx. 6 mm. EXPOSURE CYCLE: The exposure cycle is defined as (1) 7 days at 23° C. at 50% relative humidity (rh.), (2) plus 10 days in 40° C. at 100% relative humidity (rh), (3) plus 10 cycles of 4 hours at 80° C., plus 4 hours at −30° C. plus 16 hours of 40° C. at 100% relative humidity (rh). After the 10 cycles the samples will be reconditioned to room temperature. PERFORMANCE EVALUATION: To evaluate the adhesion performance, the adhesive belt is cut on the edge approx. 10 mm parallel to the substrate and peeled of in a 90° angle. Approx. each 10 mm, the peeled off bead id cut with a knife to the substrate and peeling off is continued. The peeled samples are rated according to the % of cohesive failure, meaning failure within the hardened bulk of the adhesive, particularly being 1=approx. 0% cohesive failure, 1=approx. 25% cohesive failure, 3=approx. 50% cohesive failure, 4=approx. 75% cohesive failure and 5=approx. 100% cohesive failure. Most commonly used extensions are a=adhesive with or without primer exhibits delaminating from the substrate and b=adhesive exhibits delaminating from the primer. Peel adhesion tests with an evaluation of >4 (75% cohesive failure) are fulfilling the requirements.

TABLE 1

Adhesive examples

| | Comparative 1 | Comparative 2 | Comparative 3 | Inventive 1 | Inventive 2 |
|---|---|---|---|---|---|
| Adhesive | N8 53-45 | N8 53-146 | N8 53-147 | N853-168 | N853-226 |
| PREPOLYMER 1 | 57.95 | | | | |
| PREPOLYMER 2 | | 57.44 | 57.44 | 61.54 | 59.29 |
| Polyester Prepolymer | | | | | 0.85 |
| Voranate M600 | 2 | 1.3 | 1.3 | 1.3 | 0.5 |
| Desmodur N3300 | 1 | 1.95 | 1.95 | 1.95 | 2.8 |
| Elftex ES7100 | | | | 21.5 | 21.5 |
| Printex 30 | 22 | 22.5 | 22.5 | | |
| PoleStar 200 R | 15 | 14.5 | 14.5 | | |
| Carbital 140 | | | | 11 | 11 |
| DEM | | 0.05 | 0.05 | 0.05 | 0.05 |
| Aerosil 208 | 0.8 | | | | |
| Silquest A187 | 0.4 | 0.8 | 0.8 | | |
| Silquest A 189 | | | | 0.8 | 0.99 |
| Silquest A 1170 | | | | 0.8 | 0.11 |
| Silquest A Link 597 = Dynasilan A7161 | | | 0.4 | | |
| Silquest A Link 35 | | 0.4 | | | |
| Overall Silane Content | 0.4 | 1.2 | 1.2 | 1.6 | 1.1 |
| DMDEE | 0.05 | 0.06 | 0.06 | 0.06 | 0.06 |
| UL 28 (2.4%) + VESTINOL ® | 0.8 | 1 | 1 | 1 | 1 |
| Total | 100 | 100 | 100 | 100 | 100 |
| Paint Adhesion Igloss HAPS OB 7dRT | 1 | 4 | 3 | 5 | 5 |
| Paint Adhesion Igloss HAPS OB 7dRT + 10dKKK | 1 | 5 | 4 | 5 | 5 |
| Paint Adhesion Igloss HAPS OB 7dRT + 10dKKK + 10dWA | 1 | 5 | 4 | 5 | 5 |
| Paint Adhesion Igloss OB 7dRT | 1 | 5 | 5 | 5 | 5 |
| Paint Adhesion Igloss OB 7dRT + 10dKKK | 1 | 5 | 5 | 5 | 5 |
| Paint Adhesion Igloss OB 7d RT + 10d KKK + 10dWA | 1 | 5 | 5 | 5 | 5 |
| Paint Adhesion PG40 OB 7dRT | 1 | 1-2 | 1 | 5 | 5 |
| Paint Adhesion PG40 OB 7dRT + 10dKKK | 1 | 1-2 | 1 | 5 | 5 |
| Paint Adhesion PG40 OB 7d RT + 10d KKK + 10dWA | 1 | 1-2 | 1 | 5 | 5 |

Adhesion: 1 = 100% adhesive failure
Adhesion: 5 = 100% cohesive failure
Rating: 1, 2, 3, 4, 5

Any numerical values recited in the above application include all values from the lower value to the upper value in increments of one unit provided that there is a separation of at least 2 units between any lower value and any higher value. As an example, if it is stated that the amount of a component or a value of a process variable is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:
1. A composition comprising:
a) one or more isocyanate functional prepolymers;
b) one or more catalysts for the reaction of isocyanate moieties and active hydrogen containing moieties;

c) 0.6 to about 1.1 percent by weight of one or more mercapto silanes, based on the weight of the composition;
d) 0.1 to 1.3 percent by weight of one or more amino silanes, isocyanato silanes or a mixture thereof, based on the weight of the composition;
e) one or more reinforcing fillers comprising one or more high surface area carbon blacks;
f) one or more untreated calcium carbonates;
g) one or more polyisocyanates having an isocyanate functionality of about 2 or greater; and
h) a linear plasticizer, wherein the isocyanate functional prepolymer is prepared in the presence of the linear plasticizer and/or the plasticizer is added after preparing the isocyanate functional prepolymer;
wherein the composition optionally includes a dialkyl malonate.

2. A composition according to claim 1, wherein the composition includes the dialkyl malonate and the isocyanate functional prepolymer is prepared in the presence of at least a portion of the dialkyl malonate.

3. A composition according to claim 1, wherein the composition comprises one or more amino silanes.

4. A composition according to claim 1, wherein the amino silane has one secondary amine.

5. A composition according to claim 1 wherein the amino silane is a bis(di or tri alkoxy silyl alkyl) amine.

6. A composition according to claim 1 wherein the reinforcing filler has an oil absorption number of about 80 to about 120 g/100 ml.

7. A composition according to claim 1, wherein the dialkyl malonate is present in an amount of about 0.05 to about 1 percent by weight of the composition.

8. A composition according to claim 1, wherein the linear plasticizer is a linear phthalate.

9. A composition according to claim 1, wherein the one or more polyisocyanates having an isocyanate functionality of about 2.0 or greater comprises a trimer of an aliphatic polyisocyanate, a polymeric MDI or a mixture thereof.

10. A composition according to claim 1, wherein the one or more polyisocyanates having an isocyanate functionality of about 2.0 or greater comprises a trimer of an aliphatic polyisocyanate.

11. A composition according to claim 1, which comprises:
a) from about 30 to about 65 percent by weight of the one or more isocyanate functional prepolymers (preferably prepared in the presence of a linear plasticizer and a dialkyl malonate) including any linear plasticizer and any dialkyl malonate in the isocyanate prepolymers (preferably the one or more isocyanate functional prepolymers includes a portion having one or more isocyanate groups in an amount of about 22 percent by weight to about 55 percent by weight;
b) from about 0.03 to about 1.6 percent by weight of the one or more catalysts for the reaction of isocyanate moieties and active hydrogen containing moieties;
c) from about 0.3 to about 1.5 percent by weight of the one or more mercapto silanes;
d) from about 0.4 to about 2.0 percent by weight of the one or more amino silanes, isocyanato silanes, or a mixture thereof;
e) from about 15 to about 30 percent by weight of the one or more reinforcing fillers comprising one or more high surface area carbon blacks; and
f) from about 8 to about 20 percent by weight of the one or more untreated calcium carbonates; and
g) from greater than 0 to about 3 percent by weight of the one or more polyisocyanates having an isocyanate functionality of about 2.0 or greater; and
the dialkyl malonate is present in an amount of about 0.05 to about 1 percent by weight, all percentages are based on the weight of the composition.

* * * * *